United States Patent [19]
Sheriff et al.

[11] Patent Number: 5,921,596
[45] Date of Patent: Jul. 13, 1999

[54] KITTY LITTER SCOOPER

[76] Inventors: David G. Sheriff; Carolyn L. Sheriff, both of 5090 Fishtail Palm Ave., Cocoa, Fla. 32927

[21] Appl. No.: 08/870,166

[22] Filed: Jun. 6, 1997

[51] Int. Cl.⁶ .............................. A01K 29/00; B07B 1/02
[52] U.S. Cl. .......................... 294/1.4; 209/418; 294/24; 294/55
[58] Field of Search .................. 294/1.3–1.5, 2, 294/19.1, 24, 26, 53.5, 55; 15/257.1, 257.2, 257.4–257.7; 119/161, 165, 867; 209/417–419; D7/691, 692; D8/10; D30/161, 162

[56] References Cited

U.S. PATENT DOCUMENTS

| | | |
|---|---|---|
| D. 216,863 | 3/1970 | Landreville . |
| D. 219,884 | 2/1971 | Patton ...................................... D49/26 |
| D. 314,254 | 1/1991 | Gordon ................................... D30/162 |
| D. 316,315 | 4/1991 | Elrod ..................................... 294/1.4 X |
| D. 328,016 | 7/1992 | Valerio ....................................... D8/10 |
| D. 332,675 | 1/1993 | Simon ................................... D30/162 |
| D. 347,497 | 5/1994 | VanSkiver .............................. D30/162 |
| 915,233 | 3/1909 | Smith . |
| 2,176,135 | 10/1939 | Horst ...................................... 15/257.4 |
| 2,357,114 | 8/1944 | Howe ......................................... 294/55 |
| 3,879,079 | 4/1975 | Nicholas .................................. 294/1.4 |
| 3,942,831 | 3/1976 | Sosnove ................................... 294/1.4 |
| 3,979,146 | 9/1976 | Berg ........................................... 294/55 |
| 4,741,565 | 5/1988 | Bagg ......................................... 294/1.3 |
| 4,828,690 | 5/1989 | Montez ................................. 294/55 X |
| 4,986,587 | 1/1991 | Lozano .................................... 294/1.4 |
| 5,076,627 | 12/1991 | Simon ...................................... 294/1.3 |
| 5,238,277 | 8/1993 | Robinson ................................ 294/1.3 |
| 5,417,044 | 5/1995 | Russo .................................... 294/55 X |
| 5,536,055 | 7/1996 | Kohn ....................................... 294/1.3 |
| 5,673,734 | 10/1997 | Hawley ................................ 294/55 X |

FOREIGN PATENT DOCUMENTS

| | | | |
|---|---|---|---|
| 336992 | 5/1921 | Germany ................................. 294/55 |

*Primary Examiner*—Johnny D. Cherry
*Attorney, Agent, or Firm*—Law Offices of Brian S. Steinberger; Brian S. Steinberger

[57] ABSTRACT

A kitty litter scooper that allows users to clean out litter boxes without having to stoop and bend over, and allows users to move litter boxes without having to physically touch the litter box. The scooper includes a telescoping long handle that attaches to a receptacle by an adjustable swivel connection that allows the handle to be fixed to the receptacle at different angles. The receptacle has parallel slot apertures that are sized to allow granular materials such as sand and pet litter but nothing larger to pass therethrough. The receptacle includes a rear hook portion which can be used to hook over or under an edge of a litter box to move the litter box from underneath tables, furniture and the like. The receptacle further has an extended planar lip portion having a raised wedge thereon which helps keep clump contents within the receptacle. Bent back ears on the receptacle allow it to be used to help open trash bags so that a single user can both grip and dump contents of the scooper into a loose trash bag. An optional stand can be used to aesthetically store the scooper when it's not being used.

14 Claims, 7 Drawing Sheets

KITTY LITTER SCOOPER

This invention relates to a cleaning apparatus, and in particular to a novel scooper for sifting through granular material such as pet litter and sand and removing waste clump deposits from the granular material.

BACKGROUND AND PRIOR ART

Pet litter such as kitty litter is well known to be used for lining the inside of litter boxes. The litter forms clumps when coming into contact with pet excrement and pet urine. The pet owner has the undesirable task of removing these clumps. Typical devices used to remove these clumps include small shovel type devices. See for example U.S. Pat. Nos. Des. 216,863 to Landreville; Des. 314,254 to Gordon; Des. 328,016 to Valerio; Des. 332,675 to Simon; Des. 347,497 to VanSkiver; 915,233 to Smith; 2,357,114 to Howe; 4,741,565 to Bagg; 5,076,627 to Simon; 5,238,277 to Robinson; and 5,536,055 to Kohn.

However, these prior art devices are notoriously problematic. For example, the prior art shovel devices have extremely short handles that cause the user to have to continuously stoop and bend over while cleaning the litter boxes. Furthermore, the prior art scoopers when not used are usually left on the floor next to the litter boxes causing an unsightly and undesirable appearance. Furthermore, the interior shapes of these prior art scoopers do not keep the contents inside. The scooper portion is always at a fixed angle to the handle causing the user to extensively manipulate the handle. Furthermore, most of these prior art shovel devices have open top portions which cause the contents to continuously spill out. Additional problems also exist with the prior method of using the shovel devices with a litter box. For example, users have to continuously handle and touch the litter boxes when it must be moved, (i.e. when stored under a table). Thus, moving the litter boxes may further require the user bending and stooping over to manipulate the litter box. Furthermore, these prior art shovel devices are difficult to use with plastic and paper trash bags. Presently, the user would need both hands to hold a trash bag open making it difficult for the same person to dump the shovel contents into the trash bag.

SUMMARY OF THE INVENTION

The first objective of the present invention is to provide a kitty litter scooper that can be used without a user having to stoop and bend over to clean a litter box.

The second object of this invention is to provide a kitty litter scooper that can be stored in a container adjacent to the litter box when the scooper is not being used.

The third object of this invention is to provide a kitty litter scooper having a bottom portion that keeps contents within the scooper.

The fourth object of this invention is to provide a kitty litter scooper having a partially closed top portion for helping keep contents within the scooper.

The fifth object of this invention is to provide a kitty litter scooper where the angle between the handle and the scooper portion is adjustable.

The sixth object of this invention is to provide a kitty litter scooper having a hook for moving the litter box.

The seventh object of this invention is to provide a kitty litter scooper that allows the user to hold the bag with one hand and with a second hand dump the scooper contents into the bag without spilling out any of the scooper contents onto the ground.

A preferred embodiment of the scooping device for sifting out clump waste materials from surrounding granular materials such as pet litter and sand includes a receptacle having a front opening, a base, opposing sidewalls, a rearwall and a top portion, the base, and the sidewalls each having parallel slot apertures sized to allow only the granular materials to pass therethrough, and a longitudinal handle attached to the top portion of the receptacle housing, where a standing user manipulates the handle moving the front opening of the receptacle through the granular material so that clump materials larger than the granular materials remain within the receptacle. The receptacle includes a planar lip jutting out the front opening, and a raised wedge shape section on the planar lip having a rear ledge across the receptacle opening at a higher level than the base. The planar lip further includes side ledges on both sides of the wedge shape. On the receptacle is a hook portion adjacent to at least one of the sidewalls at the opening, wherein the hook portion can be used to hook about an opening to a plastic type trash bag so that a user holding the bag with one hand can dispense the contents of the scooping device into the bag with the other hand by tilting the scooping device into the opening to the bag. The top portion of the receptacle includes a front open section above the base. Where the handle meets the receptacle, a wing nut and screw allows for the handle to be positioned at different angles relative to the receptacle. The longitudinal handle has telescoping sections that adjust the handle to a length of approximately two to approximately four feet. On the upper rear edge of the receptacle is a raised inwardly curving hook portion which allows litter boxes to be gripped over their edges or under their curled lip edges, and moved by the handle. An optional closed stand having a springably attached door allows for the scooping device to be stored inside with a portion of the handle extending vertically out therefrom.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
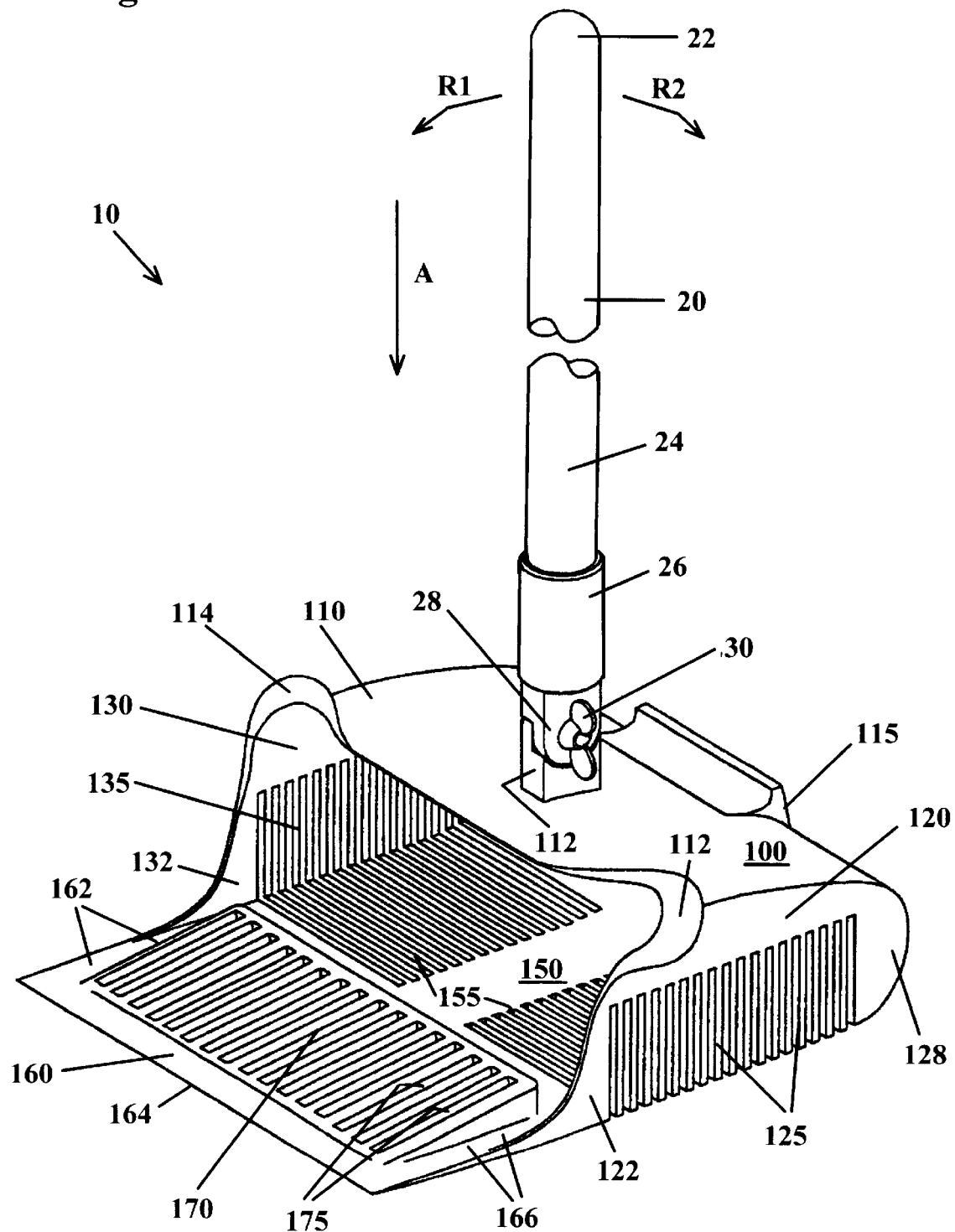
FIG. 1 is a perspective view of a preferred embodiment of the novel scooper.
Figure 2:
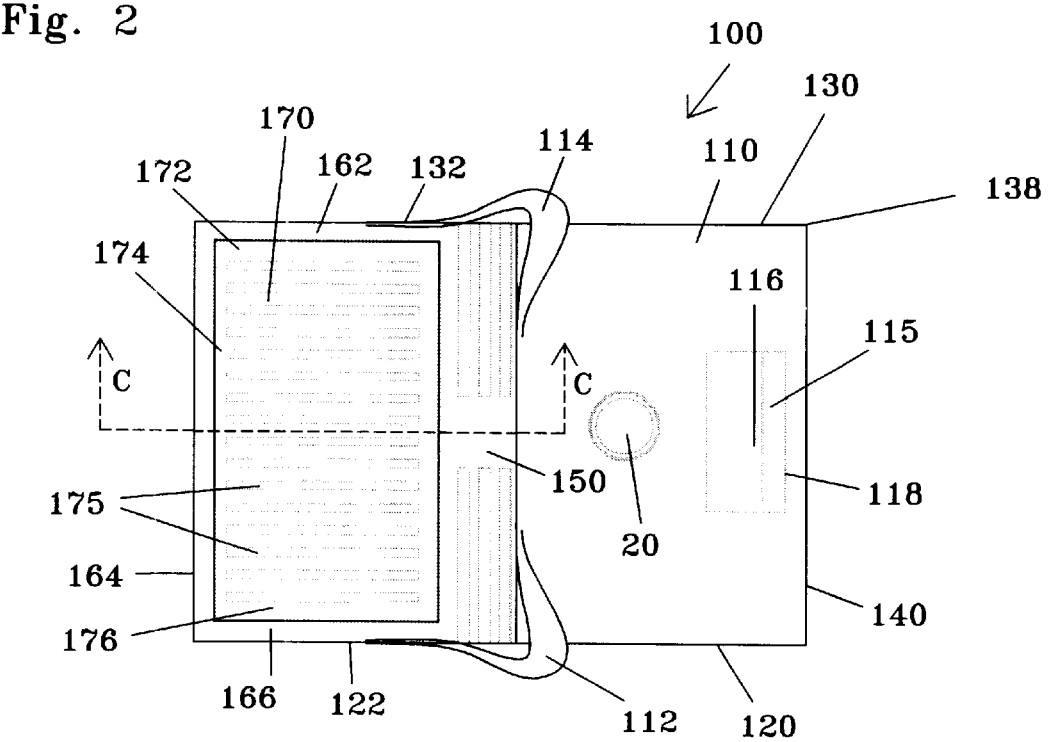
FIG. 2 is a top view of the embodiment of FIG. 1 along arrow A.
Figure 3:
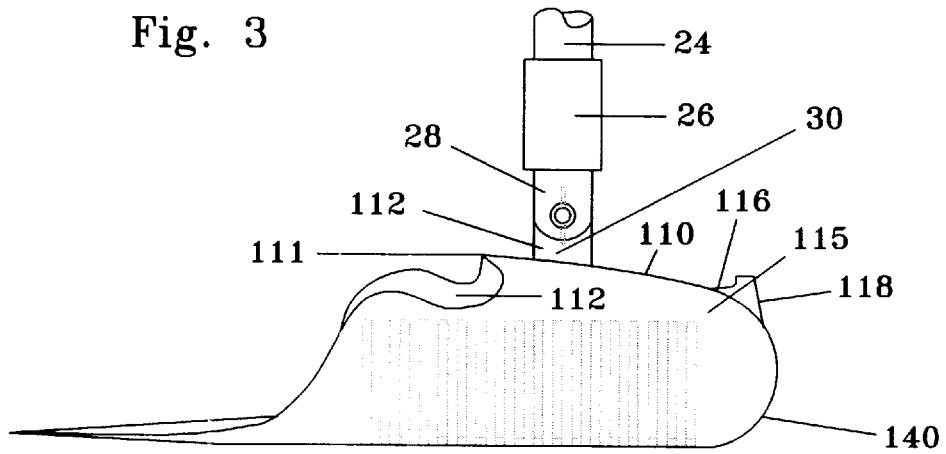
FIG. 3 is a side view of the embodiment of FIG. 2 along arrow B.

FIG. 1 is a perspective view of a preferred embodiment 10 of the novel scooper. FIG. 2 is a top view of the receptacle portion 100 of the embodiment 10 of FIG. 1 along arrow A. FIG. 3 is a side view of the embodiment 10 of FIGS. 1–2 along arrow B. Referring to FIGS. 1–3, embodiment 10 includes a longitudinal handle 20 and receptacle portion 100. Handle 10 can have an extended length of approximately one to four feet in length and includes hand gripping pole section 22, mid pole section 24, telescoping tube section 26 and lower swivel section 28. The lid top 110 of receptacle 100 has an upper swivel section 29 which connects to lower swivel section 28 of pole 20 by a wing screw and nut 30. This swivel connection 28, 30, 29 allows longitudinal handle 20 to be moved to a desired orientation angle in the direction of arrows R1 and R2 relative to receptacle 100.

Referring to FIGS. 1–3, receptacle 100 includes a downwardly curving roof lid 110 having an apex 111 area open to and over a front downwardly curving section 122, 132 of sidewalls 120, 130, respectively. Hook areas 112, 114 (whose use will be described in relation to FIG. 6) are formed from bending back corner edges of where the sidewalls 120, 130 meet the roof lid 110. Each of sidewalls 120, 130 include downwardly oriented parallel vertical slots each sized large enough to allow for granular material such as, but not limited to sand and pet litter (i.e. kitty litter) to pass therethrough. The rear portion of the sidewalls 120, 130 have rounded side walls 128, 138 connecting to a curved backwall 140. Although not shown, backwall 140 can be solid or have vertically oriented slots similar to those of sidewalls 120, 130. Attached to an upper edge of backwall 140 is a protruding portion 115 having a raised hook section 116 (whose use will be described in relation to FIG. 5) and a flat rear portion 118.

Figure 4:
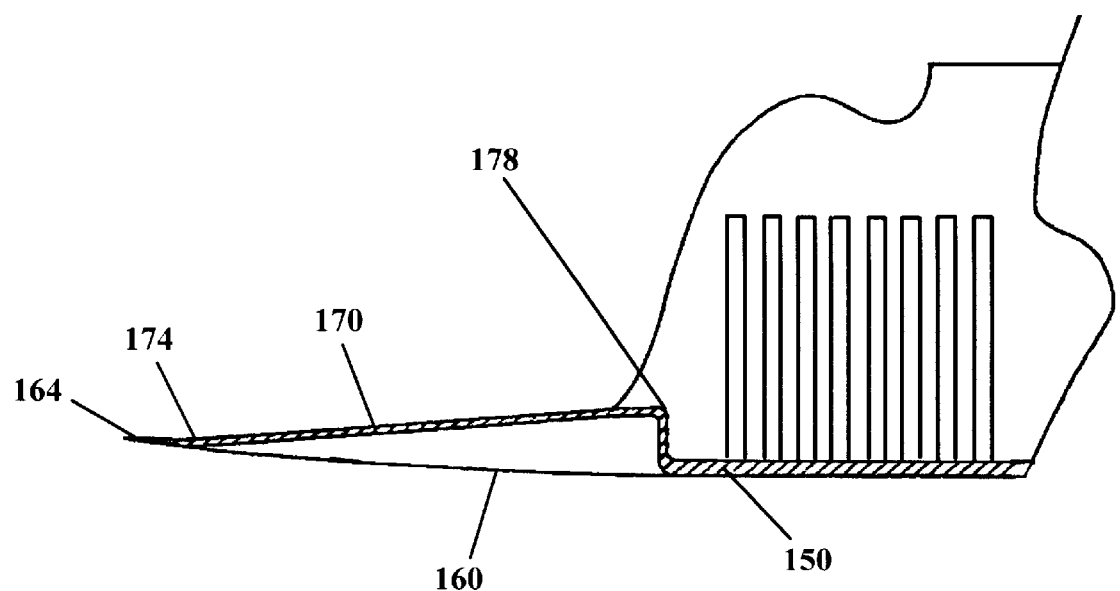
FIG. 4 is a cross-sectional view of FIG. 2 along arrow C–C.

The floor section 150 and lip 160 and wedge 170 will now be described. FIG. 4 is a cross-sectional view of FIG. 2 along arrow C—C. Referring to FIGS. 1–4, planar floor section 150 includes horizontal and parallel slots 155 sized similar to sidewall slots 125, 135 previously described, which again are sized large enough to only allow granular materials such as sand and pet litter to pass therethrough. A planar lip portion 160 juts out from floor 150 to a smaller diameter tip edge 164 which can be thin enough to allow for scraping and scooping the contents of litter boxes therein. On planar lip 160 is a raised wedge shape section 170 having parallel horizontal slots 175 which pass through lip portion 160 sized similar to the slots previously described. The front 174 of the wedge 170 rises in height to a rear ledge portion 178 which is at a higher level than floor 150. This ledge portion 178 enhances keeping sifted clump contents within receptacle 100. On each side 172, 176 of wedge 170 are side areas 162, 166 of lip 160 which form side gullies passing between wedge sidewalls 172, 176 and front sidewall portions 132, 122, respectively. These gullies 162, 166 can be the same size as the slots previously described to allow nothing larger than granular materials to pass therethrough. The receptacle 100 and longitudinal handle 20, and associated components in the above figures can be made from injection molded plastic, fiberglass, aluminum, wood, galvanized metal, combinations thereof and the like.

Figure 5A:
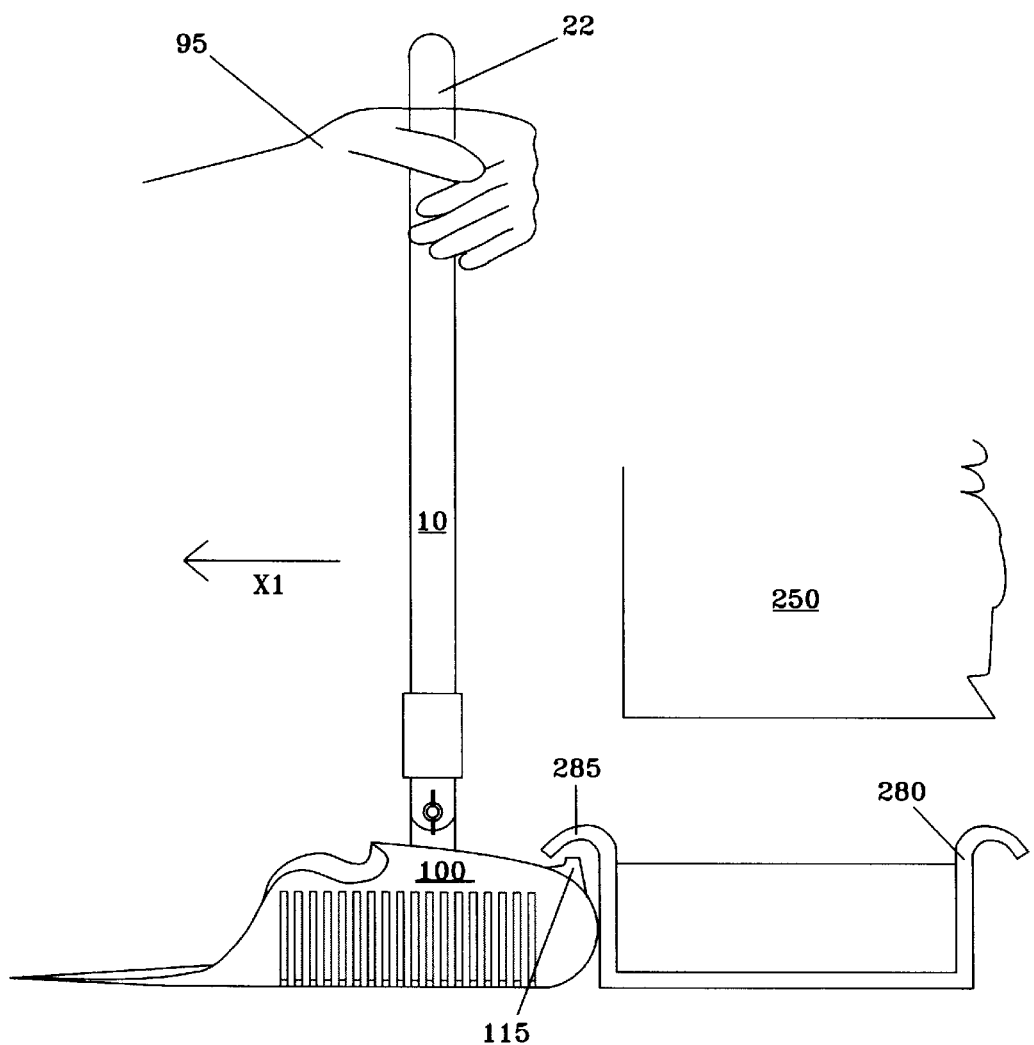
FIG. 5A shows the novel scooper moving a litter box.

FIG. 5A shows a user 95 gripping the scooper handle 22 so that the hook portion 115 of the scooper 100 hooks under the rounded curved edges 285 of a typical litterbox 280 and is used to move the litter box 280 in the direction of arrow X1 from beneath a table or furniture 250 or the like, without the user 95 having to stoop over and physically touch the litter box 280. Here the user 95 does not have to change the orientation of the scooper 100 and handle 10.

Figure 5B:
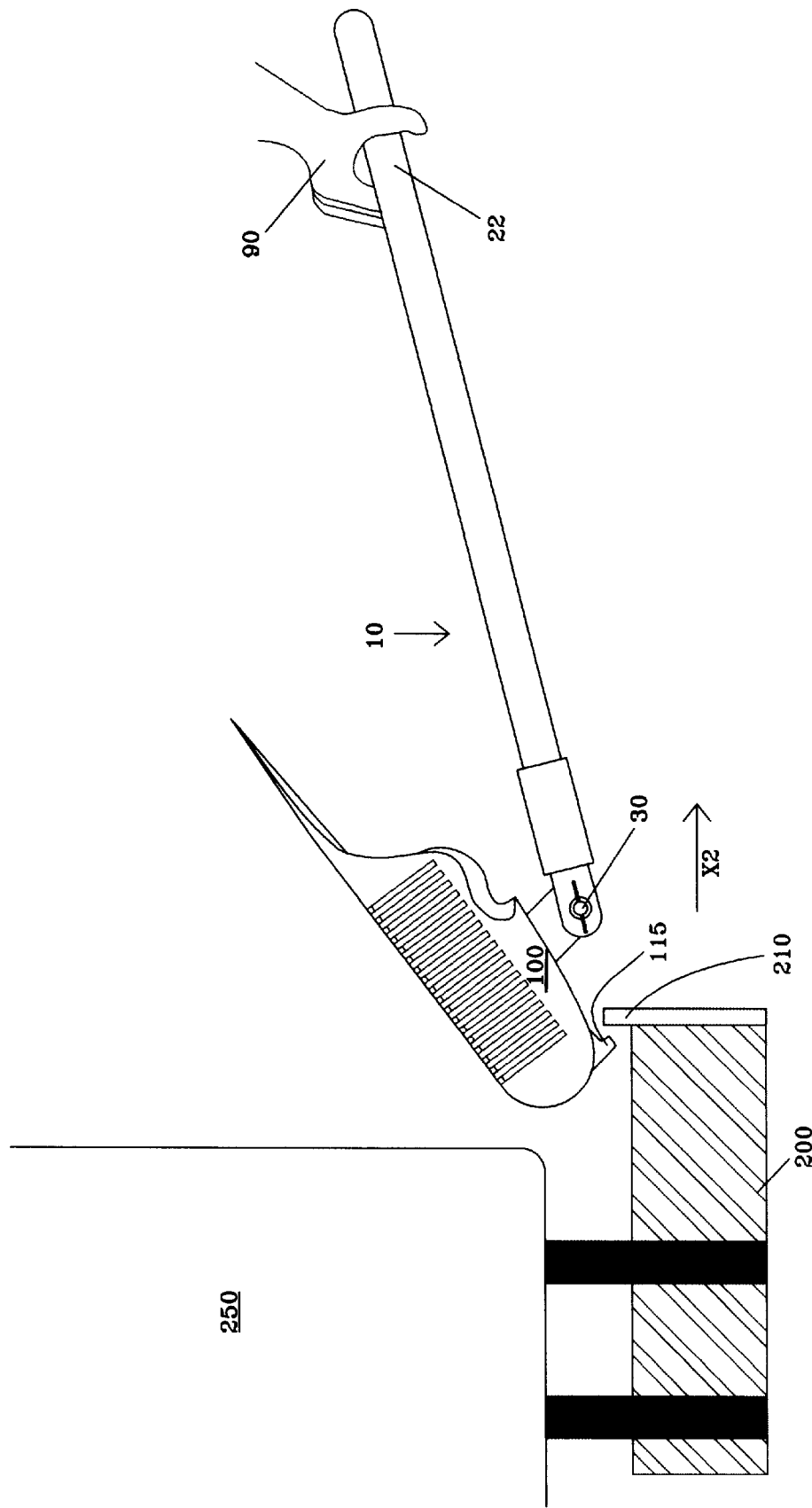
FIG. 5B shows the novel scooper being used to move another litter box.

FIG. 5B shows a user 90 gripping the scooper handle 22 so that the hook portion 115 of the scooper 100 can grip over an edge 210 of another litter box 200 to remove the box 200 from beneath a table or furniture 250 in the direction of arrow X2, without the user having to stoop over and physically touch litter box 200.

Figure 6:
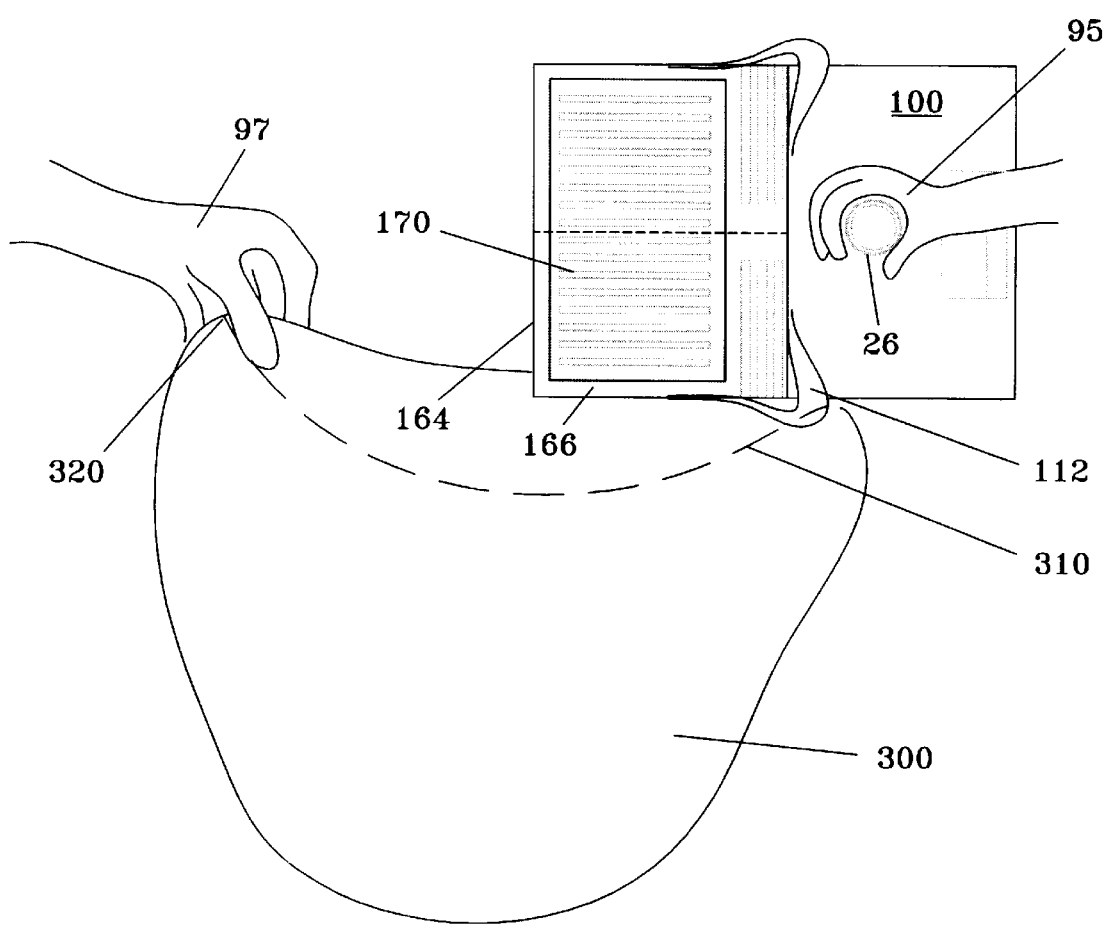
FIG. 6 shows a single user using the scooper to simultaneously open a trash bag while dumping contents of the scooper into the bag.

FIG. 6 shows the scooper receptacle being used to simultaneously open a trash bag and dump its contents into the bag. Here, the right hand 95 of the user can grip the handle 26 adjacent to the receptacle 100 and use the bent-back hook portion 112 to catch an upper edge 310 of a trash bag 300. The user's left hand can simultaneously hold opposing upper trash back edge 320 so that the trash bag is open and the contents of the scooper receptacle 100 can be dumped inside from lip edges 164, 166.

Figure 7:
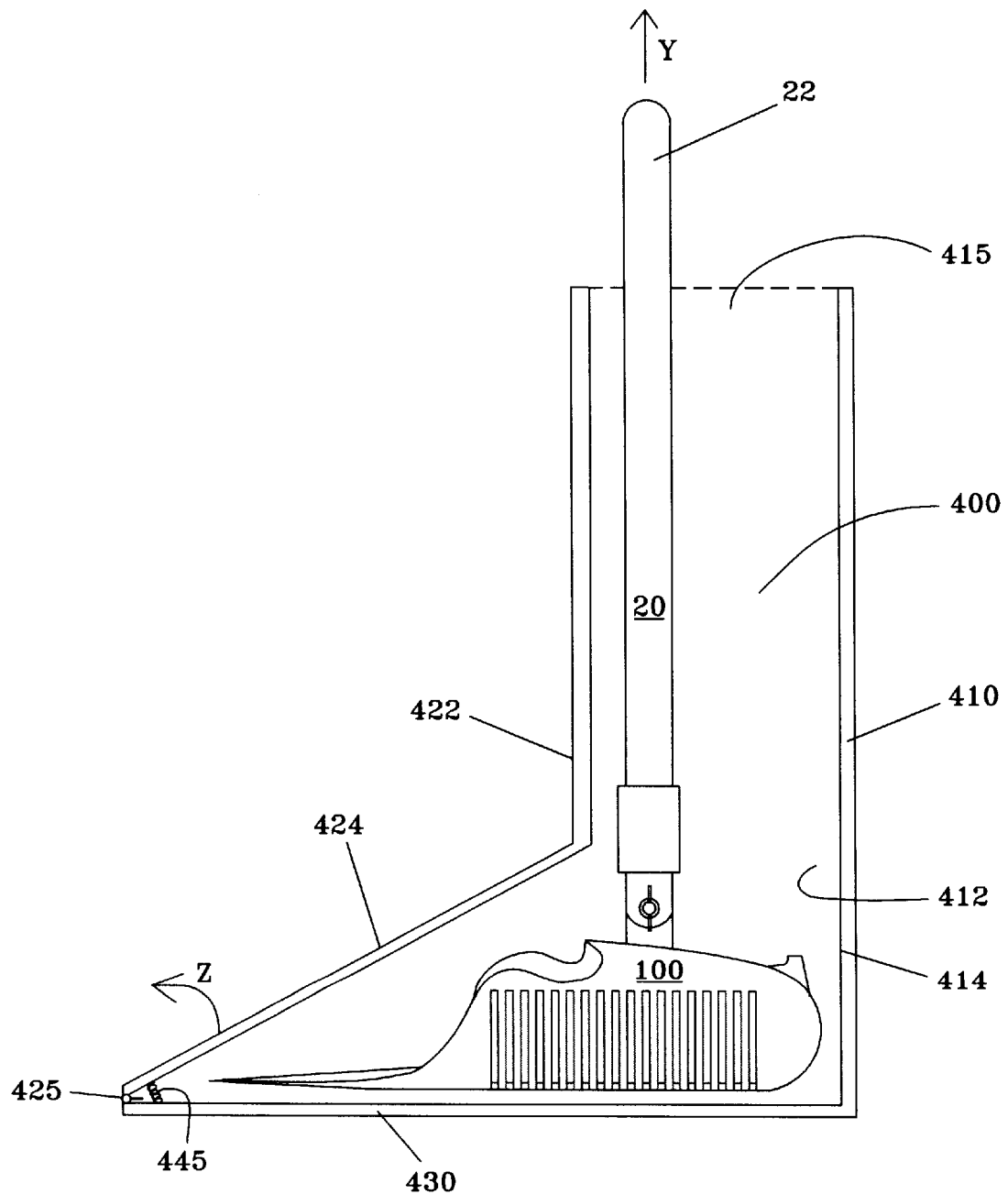
FIG. 7 shows a cross-sectional view of the scooper of FIG. 1 within a storage container.

FIG. 7 shows a cross-sectional view of the scooper 100, 20 of FIG. 1 within a storage container 400. Storage container 400 includes vertical rectangular rear wall 410 and side walls 412, 414 with an open top 415. The front vertical wall 422 has a slanted lower portion 424 which is attached by a hinge 425 to base 430. Lifting handle 22 in the direction of arrow Y causes receptacle 100 to abut against and move front wall sections 424, 422 in the direction of arrow Z away from side walls 412, 414. The spring 445 keeps the front wall sections 422, 424 substantially closed against side walls 412, 414.

Similar to receptacle 100 and longitudinal handle 20, storage container 400 and related components in FIG. 7 can be formed from injection molded plastic, fiberglass, aluminum, wood, galvanized metal, combinations thereof and the like.

Although the preferred embodiment has been described for cleaning out kitty litter, the invention can be used for other sifting applications such as, but not limited to, sifting through flower beds, sand beaches and the like, wherever sifting cleaning operations are needed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A scooping device for sifting out clump materials from surrounding granular materials, comprising:

a receptacle having a front opening, a base, opposing sidewalls, a rearwall and a top portion, the base, and the sidewalls each having apertures sized to allow granular materials to pass therethrough;

a longitudinal handle attached to the top portion of the receptacle, where a standing user manipulates the handle moving the front opening of the receptacle through the granular materials so that clump materials larger than the granular materials remains within the receptacle; and a raised hook means adjacent the rear wall which allows edges of a box to be gripped therein and moved by the handle of the scooping device.

2. The scooping device of claim 1, wherein the base of the receptacle includes:

a planar lip jutting out the front opening.

3. The scooping device of claim 2, wherein the planar lip further includes:

a raised wedge shape section on the planar lip having a rear ledge across the receptacle opening at a higher level than the base.

4. The scooping device of claim 3, wherein the planar lip further includes:

side ledges on both sides of the wedge shape.

5. The scooping device of claim 1, further including:

a hook portion adjacent to one of the sidewalls at the opening, wherein the hook portion hooks about an opening to a bag so that a user holding the bag with one hand can dispense the contents of the scooping device into the bag with the other hand by tilting the scooping device into the opening to the bag.

6. The scooping device of claim 5, wherein the hook portion includes:

a bent back section of a corner of one of the sidewalls and the top portion.

7. The scooping device of claim 1, wherein the top portion includes a front open section above a front portion of the base.

8. The scooping device of claim 1, further including:

a pivoting means adjacent to the handle and the top portion for allowing the handle to bend in relation to the top portion of the receptacle.

9. The scooping device of claim 8, wherein the pivoting means includes:

a wing nut screw.

10. The scooping device of claim 1, wherein the longitudinal handle includes:

a length of approximately one to approximately four feet.

11. The scooping device of claim 1, wherein the raised hook means includes:

a substantially flat back section which allows the scooping device to be in a vertical position off a ground surface.

12. The scooping device of claim 1, wherein the apertures include:

longitudinal slots.

13. A scooping device for sifting out clump materials from surrounding granular materials, comprising:

a receptacle having a front opening, a base, opposing sidewalls, a rearwall and a top portion, and a hook portion adjacent to one of the sidewalls at the opening; and an extendable handle attached to the top portion of the receptacle, the handle having a section which allows the handle to move relative to the receptacle, where a standing user manipulates the handle moving the front opening of the receptacle through the granular materials so that clump materials larger than the granular materials remain within the receptacle, and wherein the hook portion hooks about an opening to a bag so that a user holding the bag with one hand can dispense the contents of the scooping device into the bag with the other hand by tilting the scooping device into the opening to the bag.

14. The scooping device of claim 13, further including:

a raised hook means adjacent the rear wall which allows edges of a box to be gripped therein and moved by the handle of the scooping device.

* * * * *